(12) United States Patent
Black et al.

(10) Patent No.: US 12,069,422 B2
(45) Date of Patent: Aug. 20, 2024

(54) MICROPHONE CHARGING CASE

(71) Applicant: Sony Interactive Entertainment Inc., Tokyo (JP)

(72) Inventors: Glenn Black, San Mateo, CA (US); Celeste Bean, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 165 days.

(21) Appl. No.: 17/725,984

(22) Filed: Apr. 21, 2022

(65) Prior Publication Data

US 2023/0345167 A1 Oct. 26, 2023

(51) Int. Cl.
*H04R 1/10* (2006.01)
*H04R 1/08* (2006.01)
*G10K 11/175* (2006.01)

(52) U.S. Cl.
CPC ........... *H04R 1/1066* (2013.01); *H04R 1/083* (2013.01); *H04R 1/1025* (2013.01); *H04R 1/1041* (2013.01); *H04R 1/1083* (2013.01); *H04R 1/1091* (2013.01); *G10K 11/175* (2013.01); *H04R 2420/07* (2013.01)

(58) Field of Classification Search
CPC .. H04R 1/1066; H04R 1/1083; H04R 1/1025; H04R 1/1041
See application file for complete search history.

(56) References Cited

U.S. PATENT DOCUMENTS

| | | | |
|---|---|---|---|
| 10,764,699 B1 * | 9/2020 | Rule | G10K 11/17823 |
| 11,172,101 B1 * | 11/2021 | Boozer | H04N 23/57 |
| 11,748,918 B1 | 9/2023 | Bacim De Araujo E Silva et al. | |
| 2012/0182470 A1 | 7/2012 | Odanaka et al. | |
| 2017/0193301 A1 | 7/2017 | Wexler et al. | |
| 2018/0332559 A1 | 11/2018 | Gudivada et al. | |
| 2018/0352343 A1 | 12/2018 | Recker et al. | |
| 2020/0204898 A1 * | 6/2020 | Schoeck | H04R 1/1016 |
| 2021/0006888 A1 | 1/2021 | Geng et al. | |
| 2021/0006889 A1 * | 1/2021 | Geng | H04R 1/1016 |
| 2021/0029440 A1 | 1/2021 | Fukui | |
| 2021/0085047 A1 * | 3/2021 | Wright | A45C 13/02 |
| 2021/0345742 A1 * | 11/2021 | Wright | A45C 11/00 |
| 2022/0043624 A1 * | 2/2022 | Rajasekaran | H04M 1/72412 |
| 2022/0335807 A1 | 10/2022 | De Jong et al. | |
| 2022/0394428 A1 | 12/2022 | Movva et al. | |
| 2023/0300532 A1 * | 9/2023 | Spittle | G06F 3/165 |
| | | | 381/1 |

OTHER PUBLICATIONS

"International Search Report and Written Opinion", dated Oct. 11, 2023, from the counterpart PCT application PCT/US23/65828.
Black, et al., "Camera Charging Case", file history of related U.S. Appl. No. 17/726,037, filed Apr. 21, 2022.
Black, Glenn, "Wireless Earbud Proximity Alarm", file history of related U.S. Appl. No. 17/725,941, filed Apr. 21, 2022.

* cited by examiner

*Primary Examiner* — Simon King
(74) *Attorney, Agent, or Firm* — John M. Rogitz; John L. Rogitz

(57) ABSTRACT

A microphone can be provided on a charging case for wireless earbuds. This can be used for quality recording and microphone placement, as well as assisting in echo cancellation algorithms by measuring environmental noise. The microphone can be movably mounted to adjust for noise or echo cancelation on another device such as a cell phone.

18 Claims, 5 Drawing Sheets

MICROPHONE CHARGING CASE

FIELD

The present application relates generally to wireless earbud charging cases with microphones.

BACKGROUND

As recognized herein, wireless earbuds are a popular tool people use to listen to audio without wires dangling around their necks. The earbuds typically pair via Bluetooth with a portable source of audio such as a mobile phone.

SUMMARY

As further understood herein, wireless earbuds may find dual use as microphone supports to expand a user's mobile system functionality to augment microphone signals from a cell phone and for other purposes.

A high quality microphone can be located in the charging case for wireless earbuds. This can be used for quality recording and microphone placement, as well as assisting in echo cancellation algorithms by measuring environmental noise. The microphone can be movably mounted to adjust for noise or echo cancelation on another device such as a cell phone.

An assembly accordingly includes left and right earbuds configured to engage the ears of a person for playing audio. A charging case of the assembly is configured for charging batteries in the left and right earbuds. At least one microphone is mounted on the charging case and is configured to produce signals representing sound.

In some examples, the charging case includes a lid and a base pivotably connected to the lid and defining at least one contact for providing current to at least one of the earbuds to recharge a battery therein, with the microphone being mounted on the lid. In other examples the microphone is mounted on the base. If desired, the microphone may be coupled to a movable arm that in turn is coupled to the charging case such that a person can move the microphone relative to the charging case. The microphone may be movable between a flush position, in which the microphone with arm lies flush against the charging case, and a raised position, in which the microphone is raised away from the charging case.

In non-limiting examples an input device can be provided on the charging case and can be manipulable to vary a characteristic of an output of the microphone. The input device may include a rotatable dial and the characteristic can include sound field size.

In another aspect, a method includes charging left and right earbuds using at least one charging case configured with first and second receptacles configured to hold the respective left and right earbuds. The method further includes generating at least one signal representing sound using the charging case.

In another aspect, an apparatus includes at least one earbud configured to be located in a person's ear to provide audio into the ear. The apparatus further includes at least one charging case configured to charge at least one battery in the earbud, and at least one microphone mechanically coupled to the charging case to generate a signal indicating sound. The apparatus further includes at least one Bluetooth transceiver configured to send, based on the signal indicating sound, a sound signal to a device.

The details of the present application, both as to its structure and operation, can be best understood in reference to the accompanying drawings, in which like reference numerals refer to like parts, and in which:

DETAILED DESCRIPTION

Figure 1:
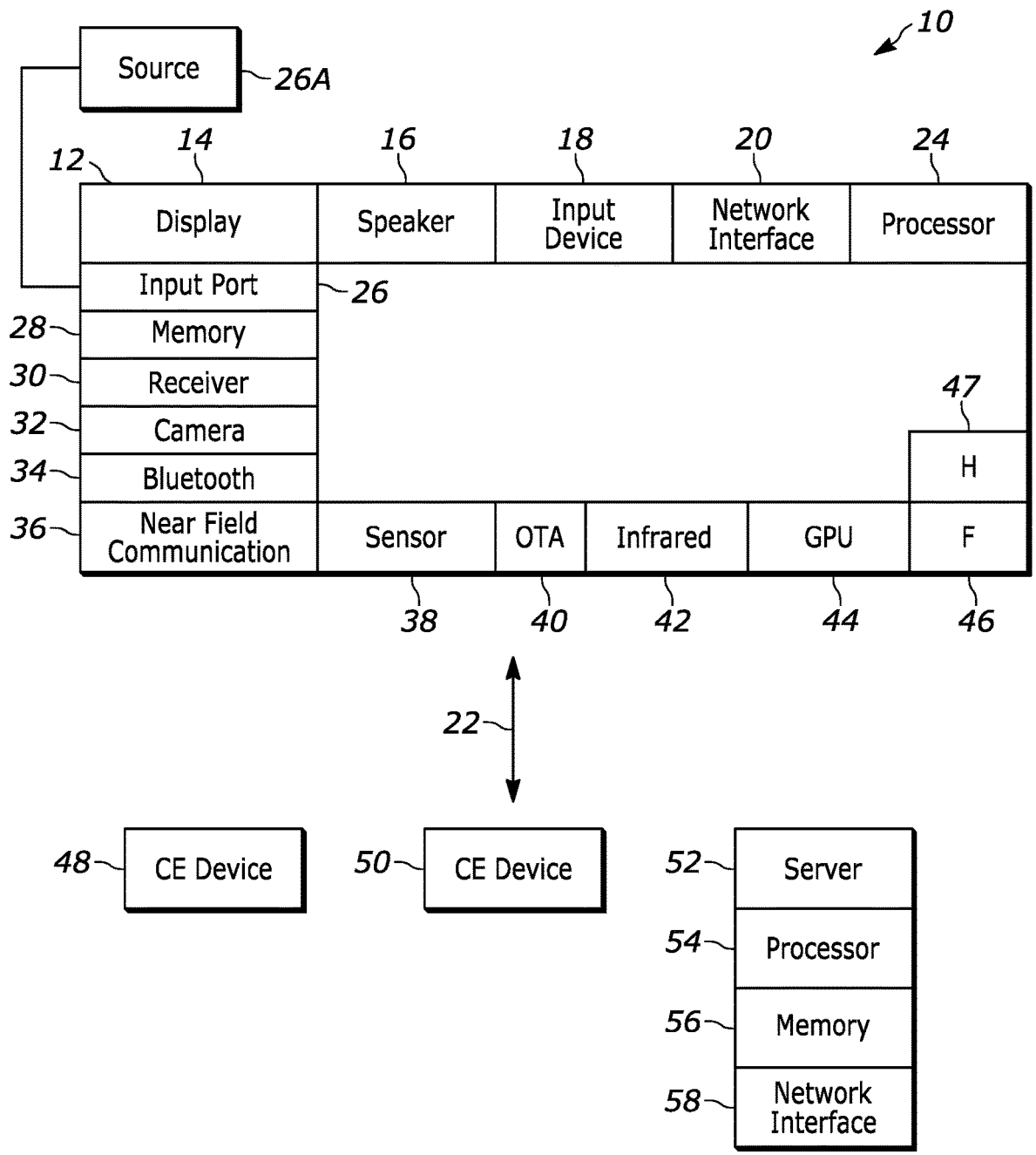
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of motion sensors such as accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content.

In the example shown, only two CE devices are shown, it being understood that fewer or greater devices may be used. A device herein may implement some or all of the components shown for the AVD 12 and/or CE devices. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

For example, the earbuds and charging case may implement some or all of the components shown for the CE devices in FIG. 1 and can include those specifically shown in the figures about to be described.

Figure 2:
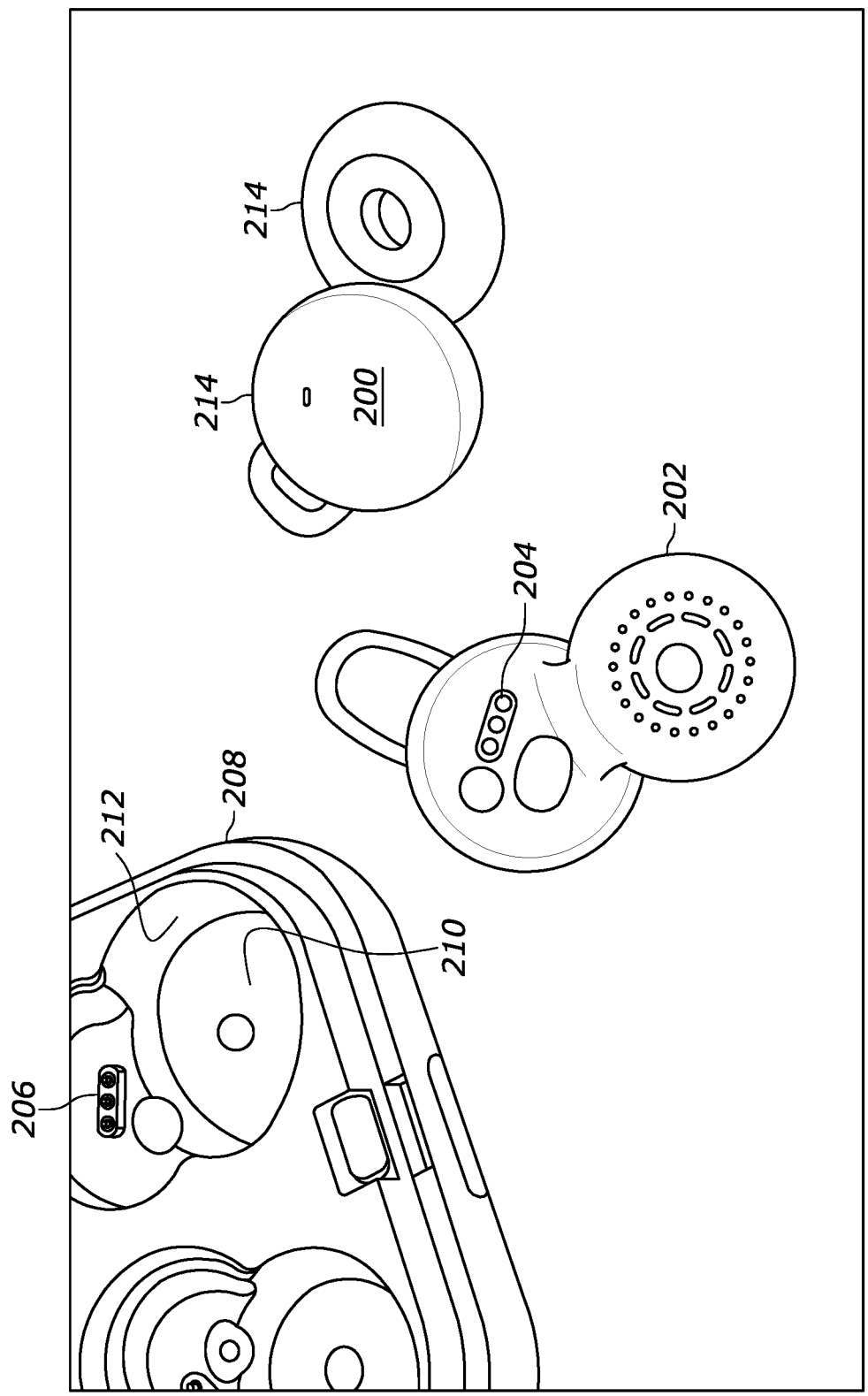
FIG. 2 illustrates example earbuds next to an earbud charging case consistent with present principles.

FIG. 2 illustrates left and right earbuds 200 that can receive wireless signals from a source of audio and transform the signals into sound that a person wearing the earbuds can hear. In the example shown, the earbuds 200 are shaped to fit into a respective ear of a person and hence have gently curved external surfaces 202 configured for this purpose.

As shown, each earbud 200 includes at least one and in the example shown three electric al contacts 204 for engaging respective charge contacts 206 of a charging case 208. The charge contacts 206 register with and contact the earbud contacts 204 to charge a battery in the respective earbud when the earbud is disposed in a charge receptacle 210 of the charging case 208. The charge receptacle 210 has a periphery 212 that, as can be appreciated in reference to FIG. 2, matches the outer periphery 214 of an earbud 200 so that the earbud 200 fits snugly within the receptacle 210 while charging.

Figure 3:
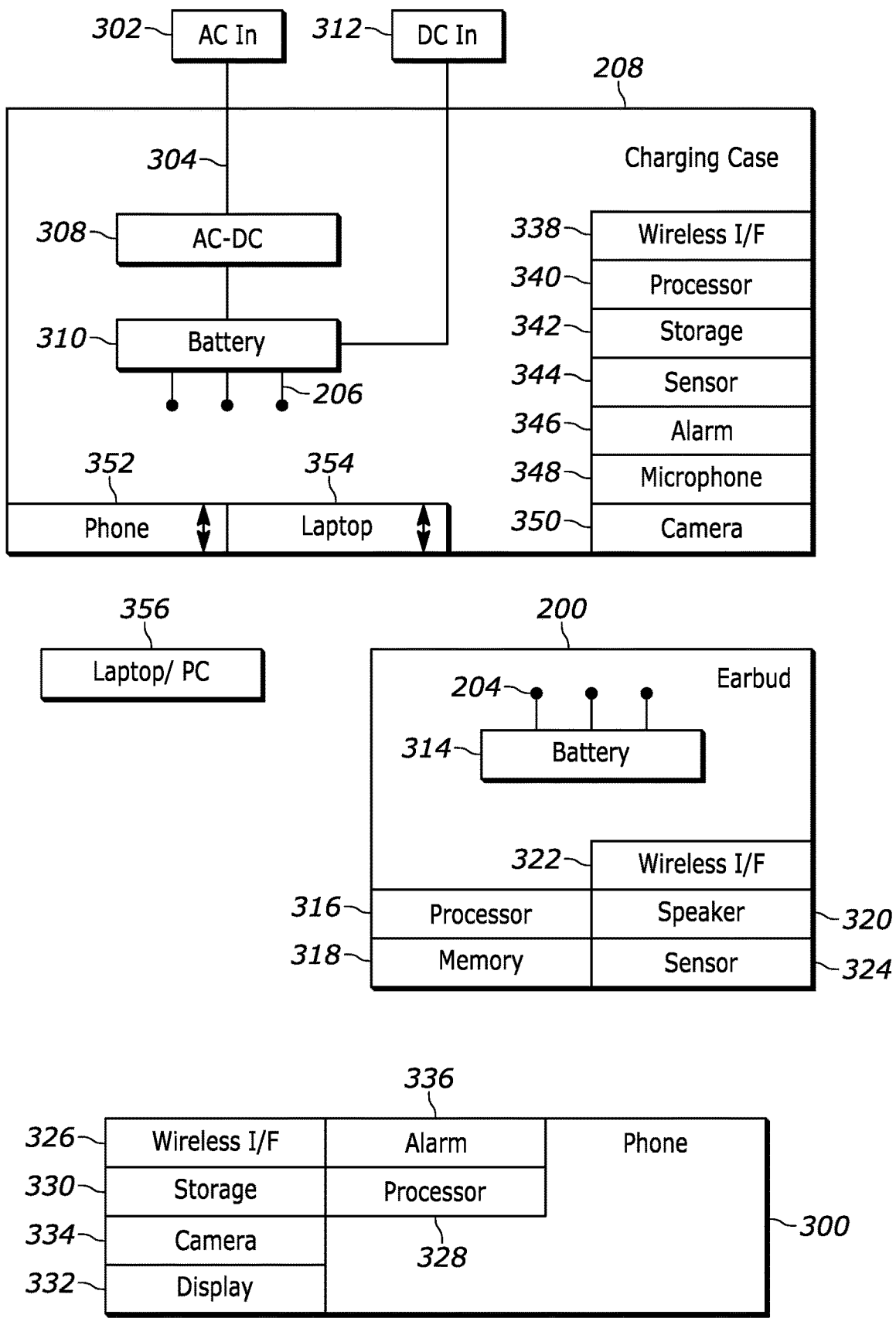
FIG. 3 is a block diagram of an example earbud, charging case, and mobile device consistent with present principles.

FIG. 3 illustrates example components in the earbud 200 and charging case 208, as well as in an audio source such as a mobile device 300. A source 302 of alternating current (AC) power such as an electrical socket can be engaged via cord 304 with an AC-to-DC converter 306 in the charging case 208. Output of the converter 308 may be used to charge one or more batteries 310 in the charging case in the example non-limiting architecture shown. Also, if desired, a source 312 of direct current (DC) power can be engaged with the charging case 208 to charge the battery 310. In the example architecture shown, the charge contacts 206 are electrically connected to battery 310 to provide DC power through the earbud contacts 204 when the earbud is disposed in the receptacle 210 of the charging case 208 to charge one or more batteries 314 in the earbud 200. It is to be understood that the charging case battery 310 may be omitted and the charging case contacts 206 connected directly to the DC source 312 and/or AC-DC converter 308.

The one or more batteries 314 of the earbud 200 supplies power to one or more processors 316 accessing one or more disk-based or solid-state computer storages 318 in the earbud to play audio on one or more speakers 320 within the earbud 200. The audio may be received via wireless signals through one or more wireless interfaces 322 such as one or more transceivers such as a Bluetooth transceiver and/or Wi-Fi transceiver from a source of audio such as the mobile device 300, which may be configured as a wireless phone. The earbud 200 also may include one or more sensors 324 such as motion sensors for purposes to be shortly disclosed.

The mobile device 300 may include one or more wireless interfaces 326 such as one or more transceivers such as a Bluetooth transceiver and/or Wi-Fi transceiver to communicate with the earbud 200. The mobile device 300 also may include one or more processors 328 accessing one or more disk-based or solid-state computer storages 330 that can contain audio tracks. The mobile device 300 may include one or more displays 332, one or more cameras 334, and one or more audible and/or visual and/or tactile alarms 336 that are controlled by the processor 328.

In the example shown, in addition to the charging components discussed above, the charging case 208 may include one or more wireless interfaces 338 such as a Bluetooth and/or Wi-Fi transceiver controlled by one or more processors 340 accessing one or more disk-based or solid-state computer storages 342. The processor 340 also may communicate with one or more sensors 344 such as motion sensors, one or more audible and/or visual and/or tactile alarms 346, one or more microphones 348, and one or more imagers 350 such as a still or video camera. The charging case 208 may further bear human-manipulable phone and computer selectors 352, 354 for increasing and decreasing the mix of audio played by the earbuds 200 from the mobile device 300 and from a laptop or laptop/PC 356, respectively, which may communicate with any or all of the components shown in FIG. 3. Note that while FIG. 3 illustrates hardware-implemented phone and computer selectors 352, 354, the selectors may be implemented in software using, e.g., a touch sensitive display.

Figure 4:
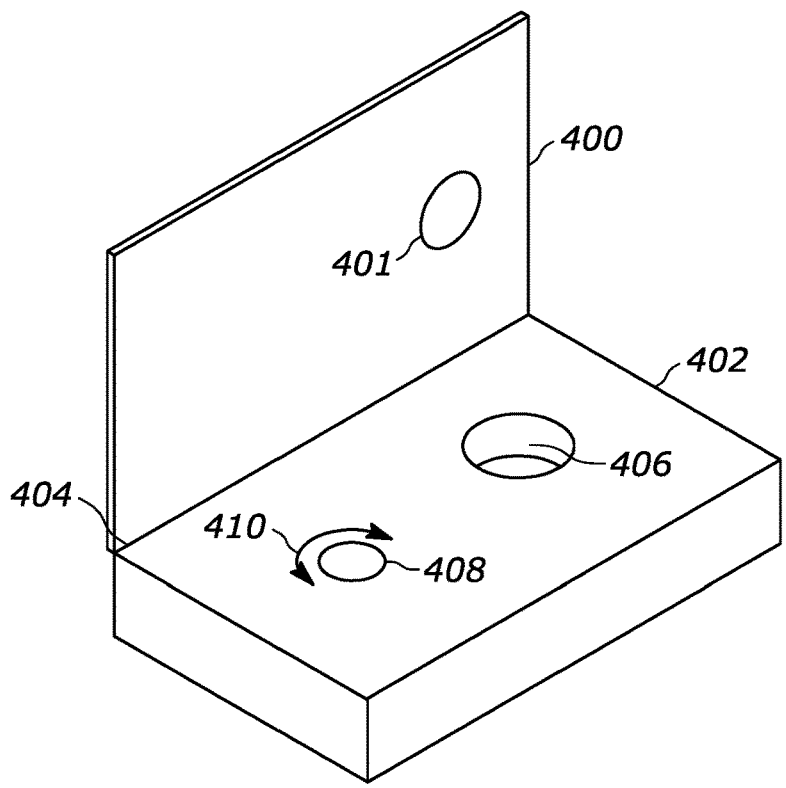
FIG. 4 illustrates a wireless charging case with a microphone in the home position.
Figure 5:
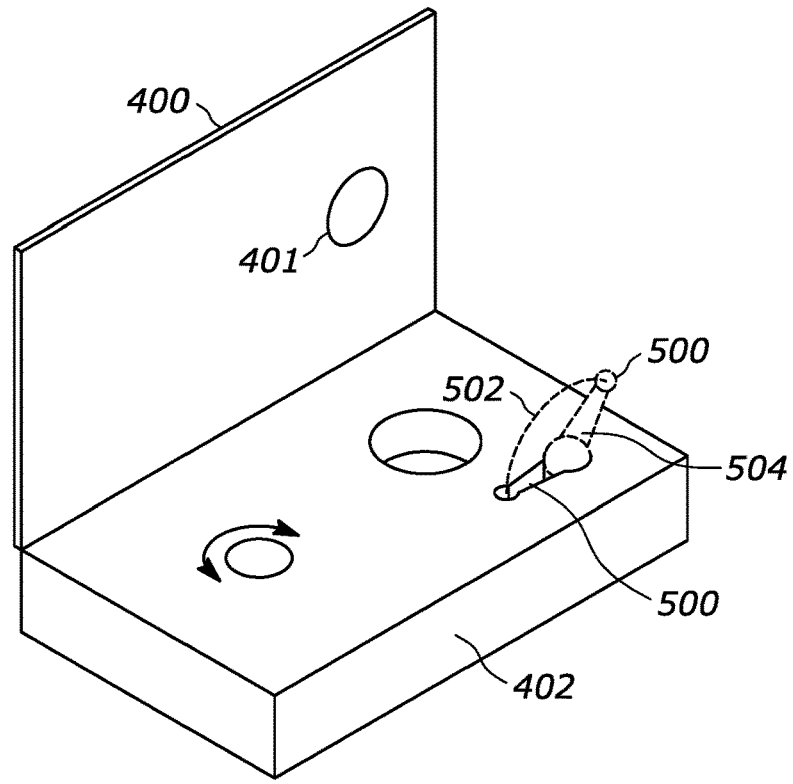
FIG. 5 illustrates a wireless charging case with a microphone in the raised position.

FIGS. 4 and 5 illustrate an earbud charging case that may be implemented by any of the charging cases herein, in which a lid 400 is foldably joined to a base 402 along a hinge 404. In the configuration shown, the charging case is in an open configuration to permit an earbud to be placed in a charging receptacle 406. The lid 400 can be folded down against the base 402 to a closed configuration in which the receptacle 406 is covered by the lid 400. A dial or other input device 408 may be provided on the base 402 in the example shown for rotation in the clockwise and counterclockwise directions indicated by the arrow 410, for purposes to be shortly disclosed. It is to be understood that in other implementations the dial 408 may be provided on the lid 400. It is to be further understood that the dial 408 may be a software dial presented on a touch display or a hardware dial rotatably mounted on the charging case.

In FIG. 4, a microphone 401 is mounted on the lid 400 to provide signals representing sound. In FIG. 5, a microphone 500 is provided on the base 402. FIG. 5 also shows that if desired, the microphone 401 may be included, it being understood that when the microphone 500 is provided on the base 402, the microphone 401 on the lid 400 may be eliminated.

Referring to the microphone 500 on the base 402 with the understanding that the same discussion may be applicable to the microphone 401 on the lid 400, the microphone 500 may be coupled to a movable arm 504 that in turn is coupled to the charging case such that a person can move the microphone relative to the charging case, as indicated by the arrow 502, between a flush position, in which the microphone with arm lies flush against the charging case, and a raised position (shown in dashed lines in FIG. 5), in which the microphone is raised away from the charging case. The arm 504 may include one or plural links. In the latter case, each link may be movably coupled to the next at a hinge or joint to provide greater articulation motion.

Figure 6:
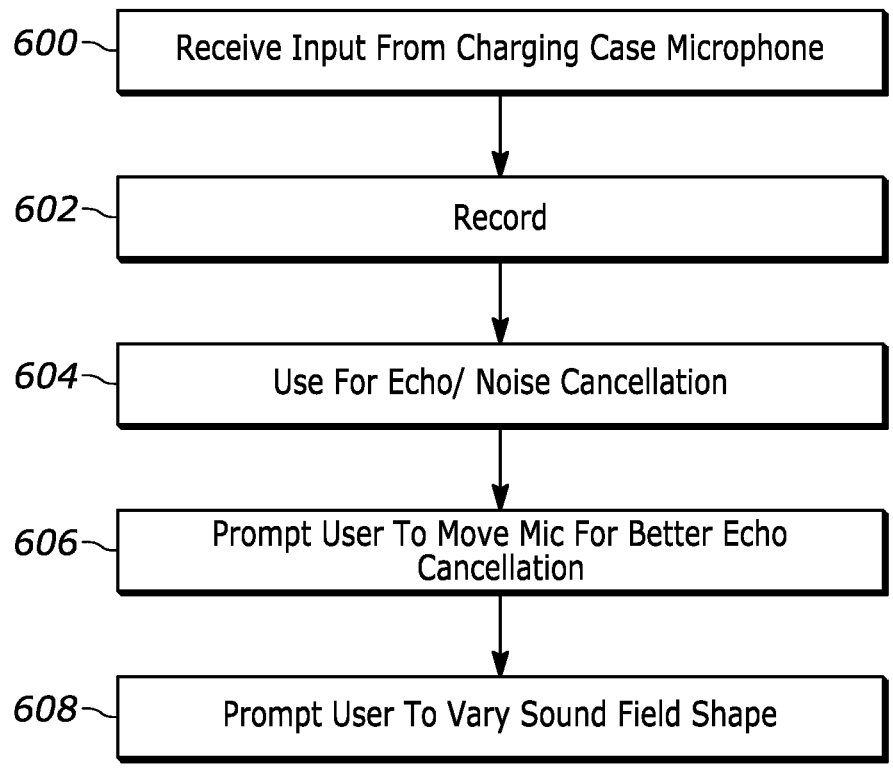
FIG. 6 illustrates example logic in example flow chart format consistent with present principles.

FIG. 6 illustrates logic that can be executed by any of the processors herein alone or in conjunction with other processors. For example, voice processing may be executed by the processor on the charging case itself to output or recognize hardware level wake-words or basic voice command functions, in addition to other logic below.

Commencing at block 600, input is received from the microphone 401 on the lid 400 of the charging case and/or from the microphone 500 on the base 402 of the charging. Hereinafter the discussion below refers to "the microphone", it being understood that the discussion applies to either or both of the microphones.

Moving to block 602, signals from the microphone are recorded. The signals may be uploaded to a server or nearby device such as the cell phone 300 shown in FIG. 3 such that a user may speak into the microphone for taking oral notes or for other purposes.

In addition, block 604 indicates that the signals may be used, e.g., for noise cancelation. For example, the signals from the microphone of the charging case may be of ambient noise and may be subtracted from signals from a microphone of the cell phone 300 into which a user is speaking nearby the charging case. Similarly, the signals from the microphone of the charging case may be used for echo cancelation.

Proceeding to block 606, the user may be prompted to move the microphone for better echo or noise cancelation, as discussed further below in reference to FIGS. 7 and 8. Furthermore, at block 608 the user may be prompted to vary the sound field shape by rotating the dial 402 shown in FIGS. 4 and 5.

Figure 7:
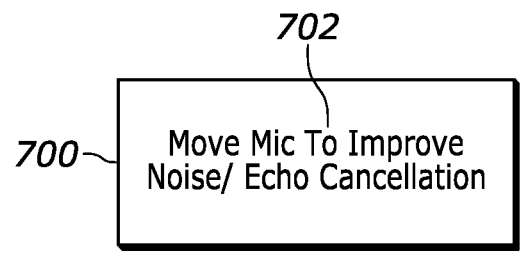
FIGS. 7 and 8 are example screen shots of example user interfaces that may be presented on any display disclosed herein consistent with present principles.
Figure 8:
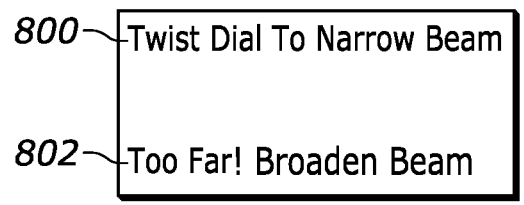

FIGS. 7 and 8 illustrate further. A display 700 such as any display divulged herein and communicating with the charging case by means of, e.g., Bluetooth, may prompt, at 702, a user to move the microphone of the charging case to improve its functionality, e.g., to improve noise or echo cancelation. FIG. 8 illustrates a prompt 800 for the user to twist the dial 402 in FIGS. 4 and 5. The user may also be advised at 802 that the user has turned the dial too far, in the example shown, the user has turned the dial too far in the beam narrowing direction, and should turn it back somewhat in the beam broadening direction, to broaden the microphone sound field.

While the particular embodiments are herein shown and described in detail, it is to be understood that the subject matter which is encompassed by the present invention is limited only by the claims.

What is claimed is:

1. An assembly, comprising:
   left and right earbuds configured to engage the ears of a person for playing audio;
   a charging case configured for charging batteries in the left and right earbuds; and
   at least one microphone mounted on the charging case and configured to produce signals representing sound, wherein the microphone is coupled to a movable arm that in turn is coupled to the charging case such that a person can move the microphone relative to the charging case.

2. The assembly of claim 1, wherein the charging case comprises a lid and a base pivotably connected to the lid and defining at least one contact for providing current to at least one of the earbuds to recharge a battery therein, the microphone being mounted on the lid.

3. The assembly of claim 1, wherein the charging case comprises a lid and a base pivotably connected to the lid and defining at least one contact for providing current to at least one of the earbuds to recharge a battery therein, the microphone being mounted on the base.

4. The assembly of claim 1, wherein the microphone is movable between a flush position, in which the microphone with arm lies flush against the charging case, and a raised position, in which the microphone is raised away from the charging case.

5. An assembly, comprising:
   left and right earbuds configured to engage the ears of a person for playing audio;
   a charging case configured for charging batteries in the left and right earbuds; and
   at least one microphone mounted on the charging case and configured to produce signals representing sound; and
   an input device on the charging case manipulable to vary a characteristic of an output of the microphone.

6. The assembly of claim 5, wherein the input device comprises a rotatable dial.

7. The assembly of claim 5, wherein the characteristic comprises sound field size.

8. A method, comprising:
   charging left and right earbuds using at least one charging case configured with first and second receptacles configured to hold the respective left and right earbuds; and generating at least one signal representing sound using the charging case, wherein the signal is generated by at least one sound sensor coupled to a movable arm that in turn is coupled to the charging case such that a person can move the sound sensor relative to the charging case.

9. The method of claim 8, wherein the sound sensor comprises at least one microphone mounted on the charging case.

10. The method of claim 9, comprising mounting the microphone on a lid movably coupled to a base of the charging case, the base comprising at least one receptacle configured for receiving an earbud.

11. The method of claim 9, comprising mounting the microphone on a base movably coupled to a lid of the charging case, the base comprising at least one receptacle configured for receiving an earbud.

12. The method of claim 9, comprising receiving, from at least one input device on the charging case, input to vary a characteristic of an output of the microphone.

13. The method of claim 12, wherein the input device comprises a rotatable dial.

14. The method of claim 12, wherein the characteristic comprises sound field size.

15. The method of claim 8, wherein the sound sensor is movable between a flush position, in which the sound sensor with arm lies flush against the charging case, and a raised position, in which the sound sensor is raised away from the charging case.

16. An apparatus comprising:
   at least one earbud configured to be located in a person's ear to provide audio into the ear;
   at least one charging case configured to charge at least one battery in the earbud;
   at least one microphone mechanically coupled to the charging case to generate a signal indicating sound; and
   an input device on the charging case manipulable to vary a characteristic of an output of the microphone.

17. The apparatus of claim 16, wherein the charging case comprises a lid and a base pivotably connected to the lid and defining at least one contact for providing current to the least one earbud to recharge a battery therein, the microphone being mounted on the lid.

18. The apparatus of claim 17, wherein the charging case comprises a lid and a base pivotably connected to the lid and defining at least one contact for providing current to the at least one earbud to recharge a battery therein, the microphone being mounted on the base.

* * * * *